United States Patent [19]
Hara et al.

[11] 3,920,783
[45] June 27, 1966

[54] EXTRUSION MOULDING METHOD

[75] Inventors: Haruichi Hara, Toyonaka; Akiyoshi Adachi, Suita, both of Japan

[73] Assignee: Nippon Shokubai Kagaku Kogyo Co., Ltd., Osaka, Japan

[22] Filed: Sept. 14, 1973

[21] Appl. No.: 397,284

Related U.S. Application Data

[63] Continuation-in-part of Ser. No. 867,326, Oct. 17, 1969, abandoned.

[30] Foreign Application Priority Data

June 27, 1977 Japan.............................. 41-41403

[52] U.S. Cl. ................ 264/118; 225/103; 264/141; 264/143; 425/222; 425/308
[51] Int. Cl............................................. B29b 1/02
[58] Field of Search .......................... 264/140–143, 264/118; 225/97, 103; 425/222, 308, 296, DIG. 101

[56] References Cited
UNITED STATES PATENTS

| | | |
|---|---|---|
| 2,540,092 | 2/1951 | Brassert .............................. 264/142 |
| 2,739,546 | 3/1956 | Bonnafoux .......................... 425/308 |
| 2,904,827 | 9/1959 | Kaiser et al. ........................ 264/141 |
| 2,938,230 | 5/1960 | Sainty ................................. 425/222 |
| 3,213,170 | 10/1965 | Erdmenger et al. ................ 264/142 |

Primary Examiner—Jeffrey R. Thurlow
Attorney, Agent, or Firm—Sherman & Shalloway

[57] ABSTRACT

A method of producing from a kneaded mass pellets moulded to a uniform dimension, which comprises disposing a surface which travels while being maintained at a specified distance from an extrusion outlet of an extruder and substantially at right angles to the direction of extrusion, and extruding a kneaded mass from the extruder, causing the distal end of the rodlike mass being extruded from the extrusion outlet to contact said traveling surface, and breaking off said rodlike mass at the rim of the extrusion outlet by the motive force of the traveling surface.

2 Claims, 4 Drawing Figures

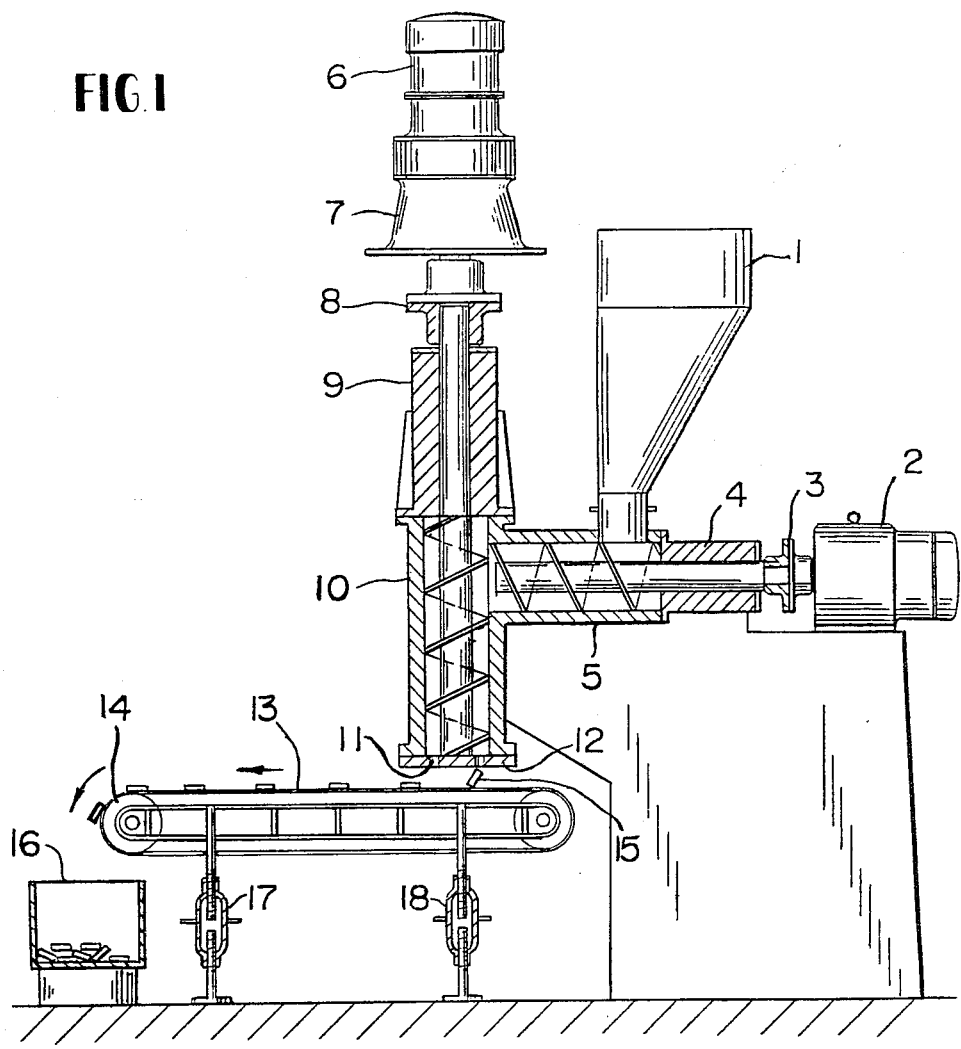
FIG.1
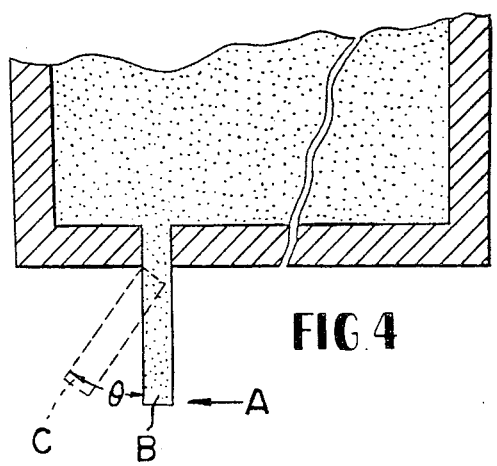
FIG.3
FIG.4

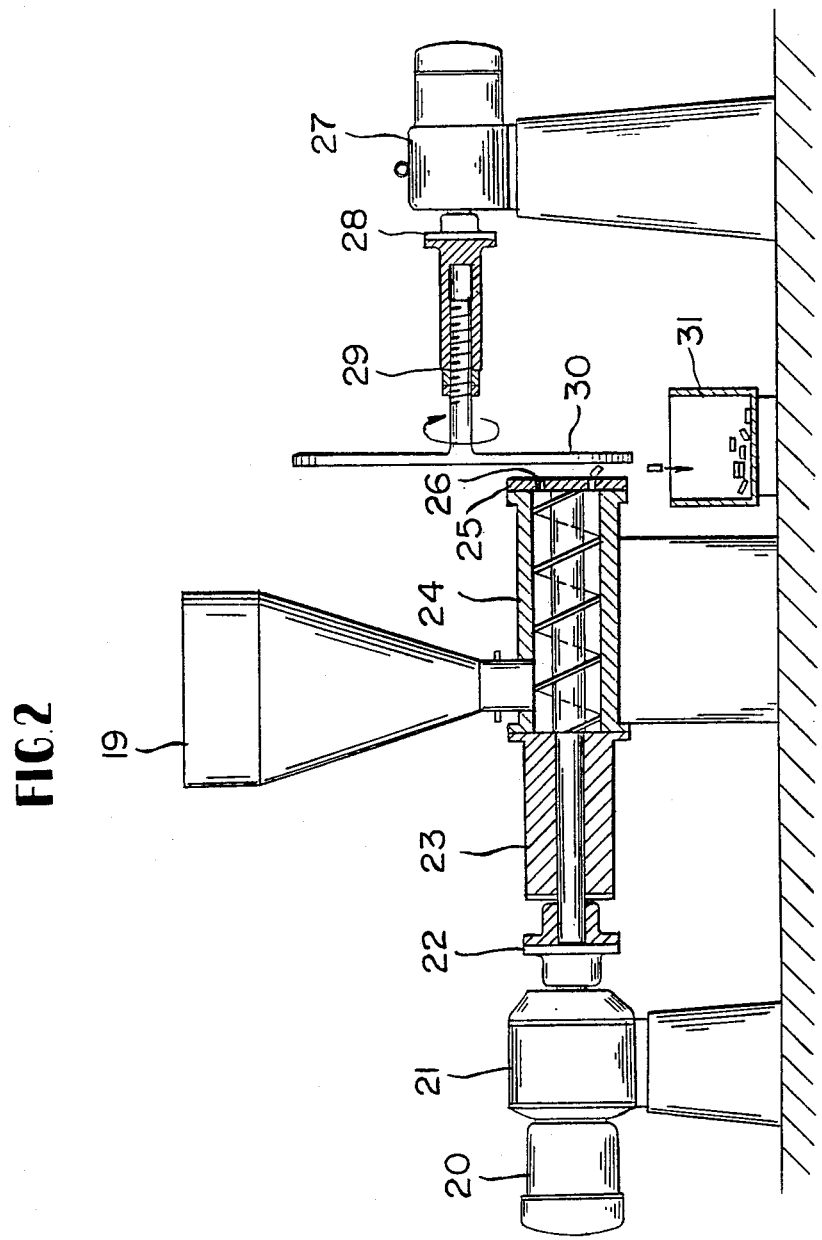

EXTRUSION MOULDING METHOD

This invention forms the subject of a continuation-in-part application to U.S. Pat. Application Ser. No. 867,326 now abandoned.

This invention relates to a method of automatically breaking off the kneaded mass being extruded from an extruder to form constant length pellets.

More particularly, the invention relates to a method of producing constant or uniform dimensional pellets of catalyst, catalyst carrier, adsorbent, etc. from kneaded masses composed of insoluble powder and water or aqueous solution, by automatically breaking off the rod-formed extrudate or extrudates being extruded from an extruder of one or plural nozzle holes at each non-uniform rate, separately by contacting each of the extrudates with a traveling surface at the moment when the extrudate reaches a predetermined length, whereby forming substantially uniform dimensional, cylindrical pellets.

It is desirable that the pellets used as catalyst, catalyst carrier, adsorbent, etc. to have uniform dimensions, because when such catalyst or adsorbent pellets are packed in a vessel such as a reactor and a gas is passed therethrough, the gas flowing in the packed layer is more easily rendered uniform with uniform size pellets than non-uniform ones. Thus, with uniform size pellets, better yield or adsorption efficiency can be obtained. Also uniform size pellets present more attractive appearance as commercial product.

Spherical pellets can be easily conformed to a uniform size even if they are molded into non-uniform dimensions, by sieving. However, with short, cylindrical pellets, it is difficult to classify them into uniform length groups by sieving, if they are molded into pellets of various lengths.

Presently, this type of pellets have been made in the following manner. The material kneaded mass is continuously extruded from a nozzle of an extrusion molder in a rodlike form, which is then cut at the front face of the nozzle at a given time interval with such as a piano wire or a blade. The length of the piece cut in this method becomes a value which equals to the linear speed of rodlike mass being extruded multiplied by the cyclic time of cutting. However, the linear speed of the extruded rodlike mass constantly fluctuates depending upon such as the feeding conditions of the material kneaded mass being fed to the extruder and the fluctuation of the extrusion pressure. Hence, it is impossible to obtain cut pieces of a uniform length by means of such a method. This defect becomes still more pronounced in an extrusion molder having plural nozzles (most of the commercially employed extrusion molders are of this type).

Therefore, it is extremely difficult to automatically cut the rod or rods being extruded at non-uniform rate or at mutually different rates always at a same, predetermined length. For this reason, stamping type tablet machines are used in the purpose of molding kneaded mass into substantially constant length short, cylindrical shapes. This method is disadvantageous for the preparation of catalyst, etc., because the cost of production is too high for industrial uses. The foregoing statements are substantiated by the fact that, heretofore known extrusion molded catalysts or adsorbents commercialized by worldly famous companies are all remarkably non-uniform in their lengths, as numerically demonstrated in later-appearing Control.

In order to overcome the foregoing drawbacks, various methods for automatic extrusion molding of uniform size products have been proposed. But some of such methods fail to divide the kneaded mass into substantially uniform size pellets, and some are even harder of handling than known stamping type tablet machines, or are inferior in their performance. For example, British Pat. No. 775,599 discloses the technique of starting and stopping the extrusion with a belt perforated with orifices which is moving in the front of the extruder nozzle. Also U.S. Pat. No. 2,847,702 teaches a method comprising filling the kneaded mass from the extruder into a traveling belt surface with perforation, and automatically withdrawing uniform size pellets at the other spot on said belt. However, the former requires further a controlling means to avoid overfilling or insufficient filling of the kneaded mass in the orifices, and in the latter the mechanism of the entire apparatus from the filling stage to the withdrawal of shaped product is much too complex and inconvenient of handling. For example, in the latter the kneaded mass adhered to the perforation walls as well as to each device must be occasionally cleaned. Furthermore, U.S. Pat. No. 2,938,230 proposes a method wherein the kneaded mass is extruded as a continuous strip or ribbon toward a traveling surface on which thin, upward blades are horizontally disposed, and pushed between said blades, followed by drying and withdrawal. This method embraces greater possibility of producing uniform size pellets compared with above-given two prior arts but its molding means is still considerably complex in structure, and is inferior to known stamping type tablet machine in precision and efficiency. U.S. Pat. No. 3,213,170 discloses a method of breaking off, from a rod being extruded from an extruder with only one nozzle, cylindrical products of no more than 2 mm in diameter and no more than twice the diameter in length, by applying a continuous air current or blast perpendicularly to the full length of the rod coming into the air current. However, in that method the force to break off the rod works incessantly from the moment the rod meets the air current to the time the latter is broken off. In the meantime, the amount of force for the breaking off constantlly increases. Thus, in order for the rod to be broken off always at a constant length, the interrelations of the extrusion speed from the extruder, the intensity of the air current, the cross-sectional area of the air passage, especially the distance from the nozzle opening to the front wall of the air passage, etc., must be under strict control. Furthermore, there is no guaranteeing that the rod will never break before it reaches the predetermined length, under certain combinations of conditions. If only one air passage is used with an extruder with plural nozzles, the difficulty will be all the more increased. Furthermore, depending on the nature of the extrudate rod, it may be distorted before broken off, when an intense air current is applied to its entire side.

We have engaged in extensive research works in the purpose of obtaining substantially uniform size pellets as can be obtained with stamping type tablet machine, by mass-production system extrusion molding, and discovered that the below-presented principle is valid. Through the process of enlargement and application of the principle in our studies, we finally successfully completed an improved method for producing extremely uniform size pellets from rod-formed extrudate or extrudates with ease and certainty.

Said principle is that "when lead of an ever-sharp pencil breaks off during writing, it is broken invariably at the rim of the exit of the lead from the ever-sharp pencil, regardless the length of the lead then projecting out of the exit." In our researches as an enlargement of the above principle, it is confirmed that the principle is perfectly applicable to rod-like extrudate of incompletely dried, moist kneaded mass, if it is not hard and brittle as lead of an ever-sharp pencil. Such a rod-like extrudate which is curved by the applied force instead of being broken off is outside the scope of this invention.

Important factors in the breaking condition are the physical properties of the starting kneaded mass, inner diameter of the exit or outlet of the nozzle, and the distance from the point at which the force is applied to the exit of the nozzle hole.

Rheologically speaking, generally the breaking phenomenon of matters can be classified into brittle fracture in which first a limited degree of elastic deformation occurs in the matter to which a certain force is applied, and thereafter breakage takes place abruptly, and plastic fracture in which the matter under force first shows elastic deformation, successively some extension due to plastic flow, and thereafter, breakage. For the breaking-off intended by the invention, it is required that the rod-formed extrudate of kneaded mass should exhibit the properties characteristic to brittle bodies when a force of the rate greater than the linear extrusion speed is applied to the rod perpendicularly at the distal end of said rod, and cause brittle fracture.

Cylindrical pellets conventionally used as catalysts, catalyst carriers, adsorbents, etc. are normally 2 – 20 mm in diameters, and 2 – 30 mm in lengths. The ratio of the length to diameter normally ranges 1 – 5. In order to produce pellets of such dimensions and shape by the method of this invention, the compositions and brittleness of the kneaded mass are inevitably subject to certain limitations. That is, the kneaded mass should be a mixture of 40 – 90 wt. % of water-insoluble powder and 60 – 10 wt. % of an aqueous medium, and should have such a brittleness that, when it is extruded through a nozzle as a rod of 5 mm in diameter and 30 mm in length and continuously applied with a force perpendicular to the direction of extrusion at a linear velocity of one centimeter per second at the distal end of the rod, the rod is broken off at the rim of the nozzle hole if it is inclined by 5° to 45° from the direction of extrusion by said force. (This requirement will be more tangibly explained later with reference to FIG. 4 of the attached drawings.)

Thus, according to the present invention, substantially uniform size pellets of 2 – 20 mm in diameter and 2.4 – 30 mm in length, the ratio of the length to diameter ranging from 1.2 to 5:1, are prepared by the process comprising extruding a kneaded mass composed of 40 – 90 wt. % of water-insoluble powder, such as catalyst, catalyst carrier, and adsorbent, and 60 – 10 wt. % of an aqueous medium, through at least one nozzle hole of 2 – 20 mm in diameter as at least one rod-formed extrudate, said kneaded mass having a brittleness defined such that when the mass is extruded through a nozzle as a straight rod of 5 mm in diameter and 30 mm in length and subjected at its distal end to a force acting horizontally at a linear velocity of 1 cm/sec., the rod is broken off at the rim of the nozzle hole if it is inclined by an angle of 5° to 45°, and impinging the rod perpendicularly with at least one flat surface which is maintained at a constant distance from the nozzle hole within the range of 2.4 – 30 mm and is traveling to a direction perpendicular to the direction of extrusion at a speed greater than the maximum linear extrusion speed, for example, an endless belt, rotating disc, and the like, whereby breaking off the rod at the rim of the nozzle hole at the moment of said impingement.

According to the subject process, when an extruder with plural nozzles is used, even when the linear speeds of the rods being extruded from the nozzles differ from each other, or fluctuate from time to time, the broken off short rods, i.e., pellets, are invariably given a substantially constant length so far as the distances between each corresponding nozzle exit and the flat surface are maintained constant, since the rods are broken at the very moments of their impingement with the corresponding moving surfaces such as of endless belts, rotating discs, etc. at their distal ends. Thus, the length of the pellets substantially conforms to the perpendicular distance from the nozzle hole to the surface of the endless belt, rotating disc, or the like. Since such distance can be readily and optionally adjusted, the pellet length can also be optionally varied. Incidentally the "maximum linear extrusion speed" refers to the maximum value of the various linear extrusion speeds of the kneaded mass being extruded through one or plural nozzles.

The water-insoluble powder to be employed in the subject process is one in which at least 80 % of the particles have a particle size of not more than 300 mesh and includes powders of various inorganic compounds useful as catalysts, catalyst carriers, adsorbents, etc., and organic compounds such as starch which are normally used as molding assistant if necessary. Also the aqueous medium include aqueous solutions of binders such as silica sol, alumina sol, etc., aqueous solutions of inorganic or organic salts useful as chief or auxiliary components of catalysts, and if necessary, aqueous solutions of various alcohols.

For example, kneaded masses for forming the following catalysts, catalyst carriers or adsorbents can be shaped into pellets in accordance with the subject process: catalyst carriers such as alumina, silica, silicates, silicon carbide, titania, zirconia and megnesia; vanadium catalyst used in the manufacture of sulfuric acid; catalysts for achieving complete combustion by oxidizing the exhaust gas of internal combustion engines and the waste gas of combustion furnaces, such as the alumina-copper oxide-manganese oxide catalysts; the vanadium oxide-silica gel-potassium sulfate catalyst used for the manufacture of phthalic anhydride; the molybdenum-cobalt-tellurium catalyst used for the oxidation of propylene; the tungsten-manganese catalyst used for the ammoxidation of aromatic compounds; reducing catalysts, adsorbents such as active carbon; and absorbents, such as silica gel, which are used for drying.

The configuration of the nozzle hole of the extruder employed in the invention may be circular, oval, polygonal, or of any other feasible shape, circular hole being most commonly employed.

Also as the endless belt, rotating disc, etc. to provide the flat surface, normally those made of rubber, cloth, or metallic materials such as of fine gauge wire, etc. are employed.

The pellets which have been formed, as hereinabove described, by being broken off into the specified dikneaded mass from the nozzles was 4 meters per minute and the traveling speed of the belt was 40 meters per minute in this case. The cylindrical pellets obtained in this manner were all of uniform dimensions, whose diameter was 4 mm and length was 9 ± 1 mm. After drying, those pellets were calcined to provide catalyst pellets which are used for the production of sulfuric acid. The shape and dimensions of the pellets were substantially the same as those possessed by the pellets before their calcination.

EXAMPLE 3

One hundred parts by weight of 50-mesh fused alumina powder, 10 parts by weight of starch, 25 parts by weight of feldspar and 15 parts by weight of water were mixed and thoroughly kneaded with a kneader. This kneaded mass was fed to an extrusion molder of the type shown in FIG. 1 having nozzle holes, whose hole diameter was 7 mm, and extruded therefrom against the surface of a conveyor belt of rubber disposed 10 mm in front of the nozzle face to provide, as hereinbefore described, cylindrical pellets. The extrusion speed of the kneaded mass from the nozzle was 3 meters per minute and the traveling speed of the belt was 50 meters per minute in this case. The cylindrical pellets obtained in this manner were all of uniform dimensions, whose diameter was 7 mm and length was 10 ± 1 mm. After drying, the pellets were calcined at above 1,000°C. to provide carrier pellets which are used to support catalysts. The shape and dimensions of the carrier pellets were substantially the same as those possessed by the pellets before their calcination.

EXAMPLE 4

A mixture of 100 parts by weight of 300-mesh alumina powder and 70 parts by weight of an alumina sol containing 10 % of alumina was thoroughly kneaded with a kneader. This kneaded mass was fed to an extrusion molder of the type shown in FIG. 2 having nozzle holes, whose diameter was 4 mm, and extruded therefrom against the surface of a rotating metallic disk disposed 6 mm in front of the front face of the nozzle to provide, as hereinbefore described, cylindrical pellets. The extrusion speed of the kneaded mass from the nozzle was 5 meters per minute and the average rotating speed of the disk was 60 meters per minute in this case. The so obtained cylindrical pellets were all of uniform dimensions, whose diameter was 4 mm and length was 6 ± 1 mm. After drying the pellets at 120°C. and thereafter calcining them at 800°C., carrier pellets which are used to support catalysts were obtained. The shape and dimensions of the carrier pellets were substantially the same as those possessed by the pellets before its calcination.

EXAMPLE 5

One hundred parts of a mixture comprising equal weights of water and a silica sol containing 20 % of silica were added to 100 parts by weight of 100-mesh silica gel powder, after which the mixture was thoroughly kneaded. This kneaded mass was fed to an extrusion molder of the type shown in FIG. 1 having nozzle holes 4 mm in diameter, and was extruded therefrom against the surfaces of conveyor belts of rubber, which were each disposed in front of the nozzles separated from the faces of the nozzles by the distance of 7 mm, to obtain, as hereinbefore described, cylindrical pellets. The extrusion speed of the kneaded mass from the nozzles was 4 meters per minute and the traveling speed of the belt was 50 meters per minute in this case. Thus obtained pellets were all of uniform dimensions, having a diameter of 4 mm and a length of 7 ± 1 mm. After drying the pellets at 120°C., calcination of the pellets was carried out at 700°C. to obtain silica gel pellets which are used for drying. The shape and dimensions of the absorbent pellets were substantially the same as those possessed by the pellets before their calcination.

Control

In all of the pellets obtained in the foregoing Examples, no difference in length greater than ± 1 mm was observed. The molded products of the invention are used, for example, as vanadium catalyst for sulfuric acid preparation. When the vanadium catalyst pellets of the subject process are compared with commercially available vanadium catalyst of the same purpose produced by other companies, for example, that produced in Germany, as to grain size distribution, the results as shown in the table below are obtained. Thus the superiority of our product is evident.

| Length (mm) | Length Distribution of The Products 7 mm in Diameter | | | |
|---|---|---|---|---|
| | Product of German Origin | | Product of the Invention | |
| | Number | Percentage % | Number | Percentage % |
| 4 – 6 | 3 | 3.2 | 0 | 0 |
| 6 – 9 | 17 | 17.9 | 0 | 0 |
| 9 – 12 | 20 | 21.1 | 95 | 100 |
| 12 – 15 | 28 | 29.5 | 0 | 0 |
| 15 – 18 | 19 | 20.0 | 0 | 0 |
| 18 – 21 | 8 | 8.4 | 0 | 0 |
| Total | 95 | 100.1 | 95 | 100 |

As so far demonstrated in the foregoing, the molding method of the invention is on the principle extremely reliable as a process for obtaining uniform size pellets. Furthermore with this method the uniform size molded products can be obtained by assembly of simpler devices compared with initially cited numbers of known molding methods. Thus the subject method is well suited for mass production, accomplishing remarkable economical advantage.

We claim:

1. A method of producing pellets for catalysts, carriers and adsorbents, wherein the pellets have substantially constant dimensions, and wherein the pellets have diameters in the range of 2 mm – 20 mm, lengths in the range of 2.4 mm – 30 mm, and length to diameter ratios in the range of 1.2 – 5:1; said method comprising the steps of:

forming a kneaded mass which is 40 to 90% water-insoluble powder by weight in which the powder has particles at least 80% of which have a particle size of not more than 300 mesh, said kneaded mass also including 60 – 10% by weight of an aqueous solution of a binder, inorganic salt, organic salt or alcohol and said kneaded mass having a brittleness such that when the mass is extruded through a nozzle hole as a straight rod 5 mm in diameter and 30 mm in length, and is subjected at an unsupported end to a normal force applied at a linear velocity of 1 cm/sec, the rod breaks at the rim of the hole when the rod inclines 5° to 45° with respect to the axis thereof;

mensions, can be imparted with rounded shape by being tumbled over a tray having a flat or curved surface.

The foregoing discussion completes the description of the principle of this invention. Now, modes of practicing the invention will be described more specifically with reference to the accompanying drawings, wherein:

FIGS. 1 and 2 are the partial sectional views showing the apparatuses useful for two preferred modes of practicing the subject process;

FIG. 3 is a plan view showing the disposition of nozzle holes; and

FIG. 4 illustrates the brittleness test of the rod-formed extrudate, in which the angle of inclination from the direction of extrusion is indicated as $\theta$. That is, the rod-formed extrudate (B) extruded into the uniform dimensions as specified in the foregoing is broken off as the pellet identified with (C), when applied with the force (A) of the direction indicated with the arrow, at its distal end.

In the apparatus illustrated in FIG. 1, a conveyor belt 13 running to the direction of arrow is disposed below the extruder with plural nozzle holes 11 perforated on its bottom. For the convenience of understanding, in the drawing the pellet formation is illustrated as to only one of the nozzle holes. Now further referring to the drawing, the kneaded mass is fed from hopper 1, and carried to the body of extruder by a monoaxial screw 5, which is driven by successively connecting a geared motor 2, coupling 3, and shaft bearing 4 by the order stated. The main body of the extruder is formed by successively connecting a motor 6, speed reducer 7, coupling 8, shaft bearing 9, and a monoaxial screw 10 by the order stated. The kneaded mass is transferred and pressurized by the screw 10, and extruded through the nozzle hole 11 under the screw 10, into a rod form. Below the flat plate 12 disposed under the extruder with nozzle holes, conveyor belt 13 disposed at a fixed space, in the direction perpendicular to the rods being extruded and in parallel with the flat plate 12, is running at a greater speed than the maximum linear extrusion speed of the rods, as driven by the pulley motor 14 in the direction of the arrow. The brittle rod extruded through the nozzle hole 11 is instantaneously broken off at the uniform dimensions, by the frictional force caused by the contact of the running belt with the distal end of the rod-formed extrudate, as soon as they come into contact, providing pellet 15. The pellet 15 is mounted on the conveyor belt 13 to be carried off to the left direction in the drawing, and collected in the box 16. The space between the flat plate 12 of the extruder and the conveyor belt 13 can be varied by the vertical space adjuster 17, 18 with the screws cut in opposite directions.

In the apparatus illustrated in FIG. 2, a rotating disc is used instead of the conveyor belt 13. The kneaded mass is fed from the hopper 19 transferred and pressurized by a monoaxial screw 29 provided with a motor 20, speed reducer 21, coupling 22, and shaft bearing 23, and extruded into a rod form through a nozzle hole 26 of a flat nozzle plate 25. A rotating disc 30 provided with a geared motor 27, coupling 28, and lock nut 29 is disposed at a fixed distance from, and in parallel with, the nozzle plate, which is rotated at a speed greater than the maximum linear extrusion speed in the direction indicated by the arrow. The brittle rod extruded through the nozzle hole 26 is broken off into the predetermined, constant dimensions at the rim of the nozzle hole 26, upon coming into contact with the rotating disc 30, and thus formed pellet falls downward.

In the method of this invention, it is necessary that the disposition of the nozzle holes is properly carried out. That is to say, the nozzle holes must be so arranged that no two holes should come one behind the other in the direction of travel of the conveyor belt or rotating disk, or else the rodlike mass being extruded would contact each other and make it impossible to obtain products of uniform dimensions. For example, referring to FIG. 3, when a molder with the nozzle holes 32a, 32b, 32c, and 32d disposed symmetrically to the center of the molder's screw is used, the conveyor belt must be caused to travel in the direction X instead of $Y_1$, $Y_2$ and $Y_3$.

The method of the invention will be hereinafter more fully described, referring to the following nonlimiting examples.

All the kneaded masses employed in the examples were first extruded through an extruder nozzle of 5 mm in diameter, into a length of 30 mm, and applied with a continuous force perpendicularly at its distal end. Since at the rods broke off when they were inclined deflected by 5° to 45°, they were confirmed to be suitable materials for the subject process.

EXAMPLE 1

55 Parts by weight of a binder comprising a 2 : 1 mixture of an alumina sol containing 10 % alumina and a silica sol containing 20 % silica were mixed with a mixture consisting of 70 parts by weight of 300-mesh activated alumina powder, 15 parts by weight of cuprous oxide and 15 parts by weight of manganese dioxide. The mixture was thoroughly kneaded with a kneader, following which the kneaded mass was extruded from the nozzle holes of the extrusion molder shown in FIG. 1 to yield cylindrical pellets as a result of the extruded rodlike mass being broken off at the rims of nozzle holes by the action of the conveyor belt made of rubber. The diameter of nozzle holes was 3 mm, while the distance between the nozzle hole outlet surface and the conveyor belt was 6 mm. The extrusion speed was 6 cm per second, and the traveling speed of the conveyor belt was 70 cm per second.

The cylindrical pellets obtained in this manner were all of uniform dimensions, whose diameter was 3 mm and length was 6 ± 1 mm. These pellets were dried at 120°C. and then calcined from 3 hours at 300°C. to provide catalyst pellets which are used to achieve the complete combustion of the exhaust gas of internal combustion engines. There was substantially no change in the shape and dimensions, of the pellets after calcination as compared with the initial shape and dimensions possessed by the pellets before the calcination.

EXAMPLE 2

800 – 1,200 Cubic centimeters of a potassium hydroxide solution of a vanadium compound (mole ratio of $K_2O$ to $V_2O_5$ of 1:2.0 – 3.5) were added to 1000 grams of diatomaceous earth followed by thorough mixing and kneading of the components. This kneaded mass was fed to an extrusion molder of the type shown in FIG. 1 having nozzle holes, whose diameter was 4 mm, and extruded from the nozzles holes against a conveyer belt of rubber disposed 9 mm below the bottom surface of the nozzles, thereby breaking off the extruded rodlike masses as hereinbefore described to obtain cylindrical pellets. The extrusion speed of the extruding the kneaded mass at a predetermined speed through a plurality of nozzle holes defined by rims having internal diameters in the range of 2mm – 20 mm, and arranged so that no two nozzles are aligned with respect to a direction normal to the axis of extrusion to form rod-like extrudates;

moving a flat surface having frictional characteristics similar to rubber parallel to said direction at a distance of 2.4 mm – 30 mm from the nozzles and at a speed greater than said predetermined speed of extrusion; and impinging the rod-like extrudates against the moving flat surface to break the extrudates off at the rims of said nozzle holes as the impingement occurs.

2. The method of claim 1, wherein the traveling flat surface is a traveling endless belt.

* * * * *

UNITED STATES PATENT OFFICE
CERTIFICATE OF CORRECTION

Patent No. 3,920,783   Dated November 18, 1975

Inventor(s) HARA, ET AL.

It is certified that error appears in the above-identified patent and that said Letters Patent are hereby corrected as shown below:

Item 45 should be changed to read -- November 18, 1975 --

The priority information should be changed to read:

-- June 27, 1966   Japan............41-41403 --

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*